United States Patent [19]

McDougal

[11] Patent Number: 4,947,680
[45] Date of Patent: Aug. 14, 1990

[54] SEPARATION OF VARIABLES IN AN ION GAP CONTROLLED ENGINE

[76] Inventor: John A. McDougal, 14388 Harbor Island, Detroit, Mich. 48215

[21] Appl. No.: 310,742

[22] Filed: Feb. 14, 1989

[51] Int. Cl.$^5$ .......................................... G01M 15/00
[52] U.S. Cl. ........................................ 73/116; 324/459
[58] Field of Search .......................... 73/116, 115, , 35; 324/459, 460, 462; 123/425, 435; 277/2, 32

[56] References Cited

U.S. PATENT DOCUMENTS

| | | | |
|---|---|---|---|
| 4,116,173 | 9/1978 | McDougal et al. | 123/117 R |
| 4,257,373 | 3/1981 | McDougal et al. | 123/424 |
| 4,304,203 | 12/1981 | Garcea et al. | 123/425 X |
| 4,308,519 | 12/1981 | Garcea et al. | 73/35 X |
| 4,364,226 | 12/1982 | Croset et al. | 60/277 X |
| 4,393,687 | 7/1983 | Muller et al. | 73/35 |
| 4,622,638 | 11/1986 | Anderson et al. | 123/425 X |
| 4,665,737 | 5/1987 | Britsch et al. | 73/35 |
| 4,736,620 | 4/1988 | Adolph | 73/35 |
| 4,736,724 | 4/1988 | Hamburg et al. | 123/435 |

FOREIGN PATENT DOCUMENTS 2131177  6/1984  United Kingdom ................ 73/116

OTHER PUBLICATIONS

SAE 860485, "In Cylinder Measurement of Combustion Characteristics Using Ionization Sensor", Robert L. Anderson.
SAE 840441, "Flame Arrival Sensing Fast Response Double Closed Loop Engine", Michael G. May.
SAE 880129, "Some Limitations to the Spherical Flame Assumption Used in Phenomenological Engine Models", Barr and Witze.
Reinz Wis. Gasket Company's Advertisement.
SAE 892099, "Cycle-Resolved Multipoint Ionization Probe Measurements in a Spark Ignition Engine", Witze.

Primary Examiner—Jerry W. Myracle
Attorney, Agent, or Firm—Harness, Dickey & Pierce

[57] ABSTRACT

An ionization gap device for detecting the arrival of a flame front propagated within a combustion chamber of an internal combustion engine. The ionization gap device particularly features a plurality of electrodes which are generally equidistantly spaced from an ignition source for detecting the arrival of the flame front at more than one location in the combustion chamber.

27 Claims, 3 Drawing Sheets

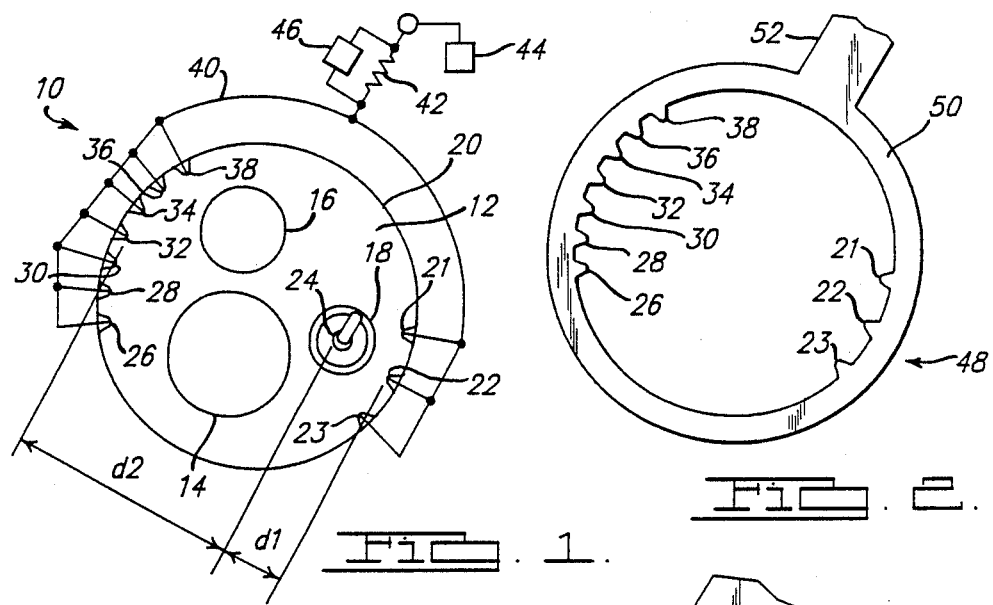
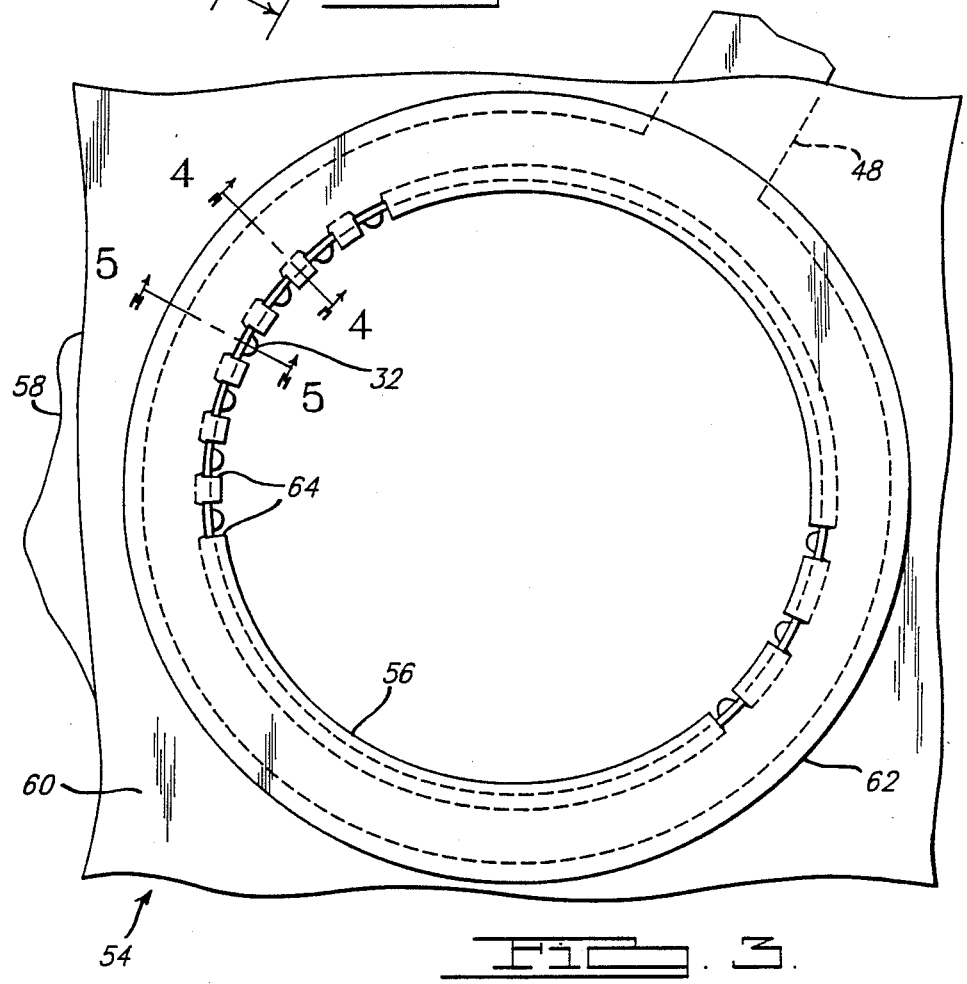

SEPARATION OF VARIABLES IN AN ION GAP CONTROLLED ENGINE

BACKGROUND AND SUMMARY OF THE INVENTION

Electronic engine control systems are commonly employed to control the operation of internal combustion engines. By precisely controlling engine functions such as air-fuel ratio, EGR and ignition timing, electronic engine control systems can optimize such variables as fuel economy, performance and exhaust emissions. To effectively control engine operation, a number of conditions can be sensed while the engine is in operation. These conditions may include crankshaft position, air/fuel ratio, engine speed, exhaust emissions, etc. Open-loop control systems utilize engine variables such as engine revolutions per minute and load to calculate engine control parameters. However, open-loop control is only correct for special conditions and does not take into account such variables as combustion chamber deposit formation, fuel composition, engine wear, etc.

To overcome the deficiencies inherent in open-loop systems, closed-loop systems, utilizing direct sensing of combustion processes for feedback control are being developed. With direct sensing of combustion processes, information such as the charge burn duration could be used to optimize such input parameters as spark advance and air/fuel ratio. This could improve engine efficiency by insuring an optimum average peak pressure arrival time.

Two ways to directly sense the combustion process are to use pressure sensors and ionization probes. A method of measuring burn duration utilizing pressure sensors is described in U.S. Pat. No. 4,736,724, issued to Hamburg, et al. However, pressure sensors are not considered practical for automotive applications because of limited durability, temperature instability and high cost. On the other hand, ionization probes offer a more durable and less costly alternative to pressure sensors. Ionization probes sense the presence of a flame at a particular location in the combustion chamber by sensing the flow of electrical current through the flame from the probe to the combustion chamber wall. The use of ionization probes for closed-loop control of internal combustion engines is described in applicant's U.S. Pat. No. 4,257,373, entitled "Internal Combustion Engine Ignition System". Considerable experimental work has been done on ionization probes subsequent to the issuance of U.S. Pat. No. 4,257,373. See, for example, S.A.E. Paper No. 840441 by Michael G. May, entitled "Flame Arrival Sensing Fast Response Double Closed Loop Engine Management", and S.A.E. Paper No. 860485 by Robert L. Anderson, entitled "In Cylinder Measurement of Combustion Characteristics Using Ionization Sensors". As reported in the latter S.A.E. Paper, it has been found that ion probes can provide an accurate indication of peak pressure time at stoichiometric air/fuel ratios. However, at leaner than stoichiometric ratios, such as those present in "lean burn" engines, the data from an ion probe has a large amount of cycle-to-cycle variance. Because of this variance, the usefulness of ion probes is marginal in automobile engine control systems.

It is believed that much of the large cycle-to-cycle variance in ion probe data is caused by flame front raggedness. At stoichiometric and richer air/fuel ratios, the flame front is generally relatively smooth and somewhat spherical as it progresses outward from the spark plug. However, as the air/fuel ratio is made leaner, the flame front surface loses its smooth character and becomes progressively more ragged. Tongues of flame will occur where the flame finds a more rapidly moving or faster burning mixture ratio. In other regions, where combustion is not as rapid, the flame is retarded behind the more advanced flame tongues. These contour variations arise from chaotic processes and are largely unpredictable. This could explain why the results from ion probe systems employing a single ion probe vary randomly. Sometimes the probe was ionized early by a flame tongue, and sometimes the probe was ionized later by a retarded portion of the flame. One way to compensate for flame front raggedness in learn-burn engines is to sample a large number of combustion chamber cycles with a given probe and then to average the data. However, in most closed-loop control systems sampling a large number of cycles would result in an unacceptably slow response.

The present invention provides a system utilizing ionization probes to accurately detect the flame front, despite flame front raggedness. To accomplish this, several ionization probes are arranged in the combustion chamber roughly equidistant from the spark plug. The electrical current passing through one or more of the probes may then be sensed for use by an engine control system. The initial signal from the array will be caused by the first of the probes to be ionized by the ragged flame front. A more consistent signal may result in this arrangement because the earliest arrival of the flame front at the probe array is consistently detected and also because the multiple electrodes sample a larger portion of the flame front. Thus, a more accurate detection of the flame position may be achieved by using an array of ionization gaps than can be generated by a single ionization gap. Consequently, the variability of the ion probe data can be reduced to the point where the data is of practical use in a closed-loop engine control system.

In the first embodiment of this invention, the multiple ionization probes described above, are located at a position remote but roughly equidistant from the spark plug. At this location, the time from the ignition of the charge in the combustion chamber until the detection of the flame front by the ion probe array is an approximate measure of the charge burning time. This measurement of charge burning time will have reduced variability, so that the charge burning time measured in this way can be used by an engine control system to optimize the engine operation.

In a second exemplary embodiment of the present invention, ionization probes are used to measure ignition delay. Ignition delay is defined as the elapsed time between the ignition spark event and the commencement of a measurable rise in combustion chamber pressure due to buring of the charge. Variability in ignition delay causes changes in the location of peak combustion chamber pressure on the engine crank circle and thus, reduces engine efficiency. Variations in ignition delay are believed to be due, in part, to variations in small-scale turbulence and to small-scale variations in mixture composition in the vicinity of the spark plug gap. Long-term factors may also influence ignition delay. These include the prevailing fuel composition, spark plug gap size and orientation, combustion chamber temperature, and deposits in the intake port and combustion chamber. Long-term factors, which influence ignition delay, may also be partially compensated for with closed-loop control systems, for example, by adjusting the spark advance for a particular combustion chamber of the engine. This embodiment of the present invention measures ignition delay by placing one or more ion gaps in very close proximity to the spark plug. The time duration between the ignition spark event and the arrival of the flame front at the ion gap in close proximity to the spark plug may be considered to be the ignition delay. This measurement of the ignition delay is useful in closed-loop control of the engine.

In a third exemplary system, knowledge of the ignition delay time is used to achieve a more accurate measurement of charge burning time. This is possible because the ignition delay is included in the measurement of the charge burning time in the first embodiment described above. Since the ignition delay varies, a small amount of variation is consequently introduced into the charge burning time calculation. Accordingly, a more accurate charge burning time can be calculated by subtracting a first time duration (measured by the ionization detector close the spark plug) from a second time duration (measured by the ionization detector located remotely from the spark plug). Additionally, if the magnitude of the gross charge burning time measured in this way becomes so short that it indicates the presence of detonation, this information may also be used to retard spark advance. In this way, the system can be used as a knock control system. Finally, because different factors influence ignition delay and the subsequent charge burning time, more cogent control systems may result from an ion probe arrangement which is capable of presenting the control system with separate signals representative of these two combustion parameters.

BRIEF DESCRIPTION OF THE DRAWINGS

FIG. 1 is a schematic plan view of a cylinder head showing locations of the spark plug and the ion gap arrays in accordance with the present invention.

FIG. 2 is an ion gap electrode ring in accordance with the present invention.

FIG. 3 is an enlarged fragmentary plan view of a portion of a cylinder head gasket with the ion gap arrays installed in accordance with the present invention.

DETAILED DESCRIPTION OF THE INVENTION

Figure 4:
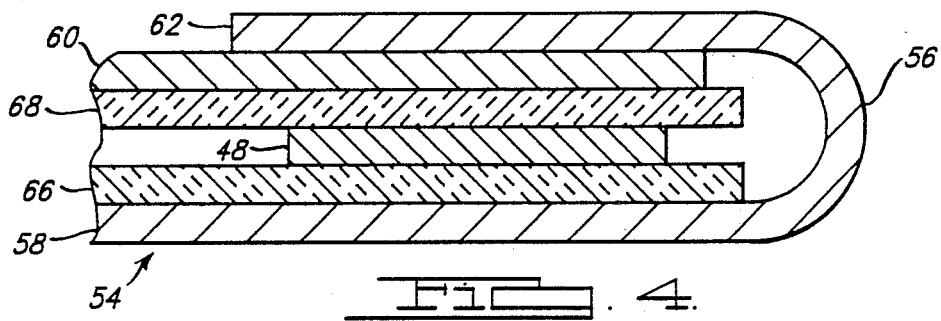
FIG. 4 is an enlarged radial sectional view taken at line 4—4 in FIG. 3 showing a portion of an ion gap array in accordance with the present invention.

In FIG. 1, an ionization detector 10 is shown for use with an internal combustion engine. The ionization detector 10 is shown for use with an internal combustion engine. The ionization detector 10 is positioned around the perimeter of an engine cylinder head 12. An intake valve 14 and an exhaust valve 16 are shown at the surface of the cylinder head 12 that form the top portion of the combustion chamber in the internal combustion engine. The portion of a spark plug 18 that is visible from the combustion chamber is also shown. The inside diameter of the combustion chamber is defined by the combustion chamber wall 20. Three ion gaps 21, 22 and 23 shown schematically, protrude slightly into the combustion chamber along the portion of the combustion chamber wall 20 that is nearest the spark plug 18. The spark plug 18 has a gap portion 24, which is approximately equidistant from each of three ion gaps 21, 22, 23. In FIG. 1 this distance is labeled d1.

Seven additional ion gaps, or electrodes, 26, 28, 30, 32, 34, 36, 38 are also shown in FIG. 1. Like the first set of gaps 21, 22, 23, the second ion gaps 26–38 protrude slightly into the interior of the combustion chamber beyond the combustion chamber wall 20. All of the ion gaps 21, 22, 23, 16–38 are connected electrically in parallel by means of a conductor 40 shown schematically in FIG. 1. The seven ion gaps 26–38 are approximately equally distant to the spark plug gap 24. In FIG. 1 this distance is labeled d2. A resistor 42 is connected at one end to conductor 40 and the other end of the resistor 42 is connected to a voltage source 44. The voltage source 44 may be, for example, a 300 volt regulated power supply. A voltage measuring device 46 is connected electrically across the ends of the resistor 42.

In operation, when a charge in the combustion chamber is ignited by the spark plug 18, an approximately spherical flame will expand from an initial flame kernel in the area of the spark plug gap 24. If the charge is relatively lean, the flame front will be ragged. When any part of this flame reaches any of the ion gap electrodes 21, 22, 23, 26–38, current will flow between that ion gap electrode and the combustion chamber wall through the ionized gas of the flame. This occurs because each of the electrodes 21, 22, 23, 26–38 are at a high positive voltage potential induced by the voltage source 44, with respect to the electrical ground of the system. Since the combustion chamber wall is at electrical ground, the electrically conductive ionized gas in the flame will permit current to flow between an electrode and the combustion chamber wall. Consequently, the existence of current flowing through any of the ion gaps 21, 22, 23, 26–38 will cause a voltage to appear across the resistor 42. In this way, the voltage measuring device 46 will measure a current whenever the flame touches any of the electrodes. This current is designated the ion probe electrode current.

Referring now to FIG. 2, an electrode ring 48 is shown. This electrode ring 48 may preferably be made of sheet copper and nickel plated to resist corrosion of the electrode portions 21, 22, 23, 26–38, since these portions are to be directly exposed to the combustion chamber. The electrode ring 48 should be uniform in thickness because it will comprise part of the cylinder head gasket which must seal combustion chamber pressures. The electrode portions 21, 22, 23, 26–38 comprise small, flat 60° flat triangular porjections which extend inward radially from the inside diameter of the ring. It is important to avoid hot spots in the combustion chamber, since they could cause pre-ignition. For this reason, the inner corners of the triangular projections are radiused and the other corners of the projections should also be radiused. A ring portion 50, as well as a tab portion 52, both serve as the electrical conductor 40 that was depicted schematically in FIG. 1. The ring portion 50 also acts as a heat sink to conduct heat away from the electrodes, 21, 22, 23, 26–38.

In FIG. 3, a portion of a cylinder head gasket 54 in accordance with the present invention is shown. The electrode ring 48 shown in FIG. 2 is shown assembled into the head gasket 54. Except for protruding portions 21, 22, 23, 26–38, most of the ring 48 is shown with dashed lines because it is covered by other layers of material in the assembled head gasket 54. The inside diameter 56 of the gasket 54 coincides with the inside diameter of the particlar engine cylinder that this portion of the gasket is intended to seal. A bottom sheet portion 58 of the gasket 54 has been extruded up to form the inside diameter of the gasket 56 and has been folded outward over a top sheet 60 of the gasket 54. The outside edge 62 of the folded out portion of the bottom sheet 58 can be seen lying on top of the top sheet 60. At the folded portion, the bottom sheet 58 has a series of openings 64 which permit the electrodes, 22, 22, 23, 26–38 to protrude inward slightly beyond the inside diameter 56 of the head gasket 54.

Figure 5:
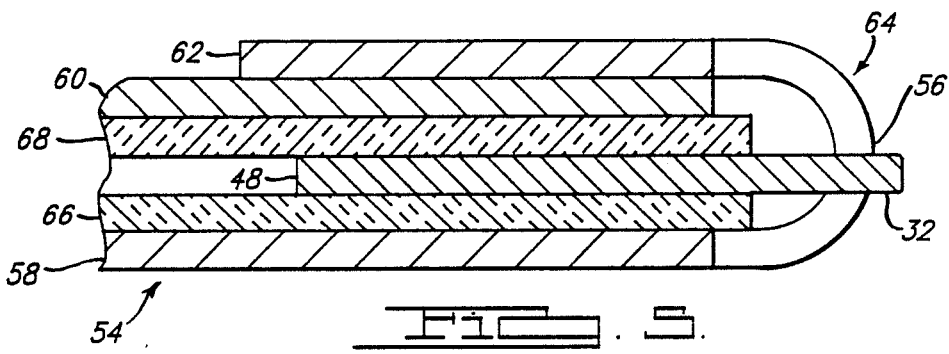
FIG. 5 is an enlarged radial section view taken at line 5—5 of FIG. 3 showing a portion of an ion gap array in accordance with the present invention.

Referring now to FIG. 4 there is shown a cross section of the head gasket 54 taken along line 4—4 of FIG. 3. Likewise, FIG. 5 is a cross section of the head gasket 54 taken along the line 5—5 in FIG. 3. The bottom sheet 58 extends horizontally toward the combustion chamber and is folded upward and rests on top of top sheet 60. The outside edge 62 of the folded out portion of bottom sheet 58 is also shown. At the extreme right of FIG. 4, the inside diameter 56 of the head gasket 54 is formed by the folded portion of bottom surface of the bottom sheet 58. FIG. 5 depicts that portion of the bottom sheet 58 having an opening 64. It should be noted that the electrode ring 48 is shown in FIG. 4 in cross section at a portion that does not contain an electrode. On the other hand, FIG. 5 depicts a portion of the electrode ring 48 where there is an electrode 32. It can be seen in FIG. 5 that the electrode 32 protrudes beyond the inside diameter 56 of the head gasket 54. consequently, the electrode 32 protrudes inside the combustion chamber of the engine through the opening 64. It should be noted that the electrode 32 must protrude beyond the diameter 56 enough to reach beyond the cylinder wall quench zone and into a volume of the combustion chamber that will be ionized by the flame. On the other hand, the electrode 32 must not protude too far or else it will become overheated when the engine is under heavy load and this may cause pre-ignition. To illustrate one example, satisfactory performance may be achieved with the electrode 32 protruding about one sixteenth inch in some applications.

The electrode ring 48 is retained between two electrical insulating sheets 66, 68. The thickness of these insulating sheets 66, 68 must be chosen to avoid excessive current leakage across these insulating sheets 66, 68 between the electrode ring 48 and the head gasket top sheet 60 and the bottom sheet 58. It should be noted that the electrode ring 48 is maintained at about 300 volts DC while the head gasket top sheet 60 and bottom sheet 58 are grounded. An additional requirement is imposed on the insulating sheets 66, 68 because they are exposed to the combustion chamber environment. Consequently, the material for these insulating sheets 66, 68 must not decompose in this environment to form electrically conductive constituents. For example, asbestos based compositions have been widely used in past cylinder head gaskets. Additional requirements on the material composition of the insulating sheets 66, 68 include meeting the stiffness and resilience requirements for the primary sealing function of the cylinder head gasket 54. Following a period of use, electrically conductive carbon depositions may build up on the insulation sheets 66, 68. These depositions may be easily burned off by briefly connecting the electrode ring 48 to a source of high current such as a 12 volt automotive battery.

While the electrode ring 48 is shown in FIGS. 2–5 to be separable from the cylinder head gasket 54, it should be appreciated that a composite or bonded gasket could be formed which incorporates a plurality of ion gap electrodes. In other words, the principles of the present invention are equally applicable to unitary structures as well as structures where a separate electrode ring is combined with a head gasket assembly. In this regard, it should be appreciated that the present invention is susceptible to a wide variety of structural implementation.

Figure 6:
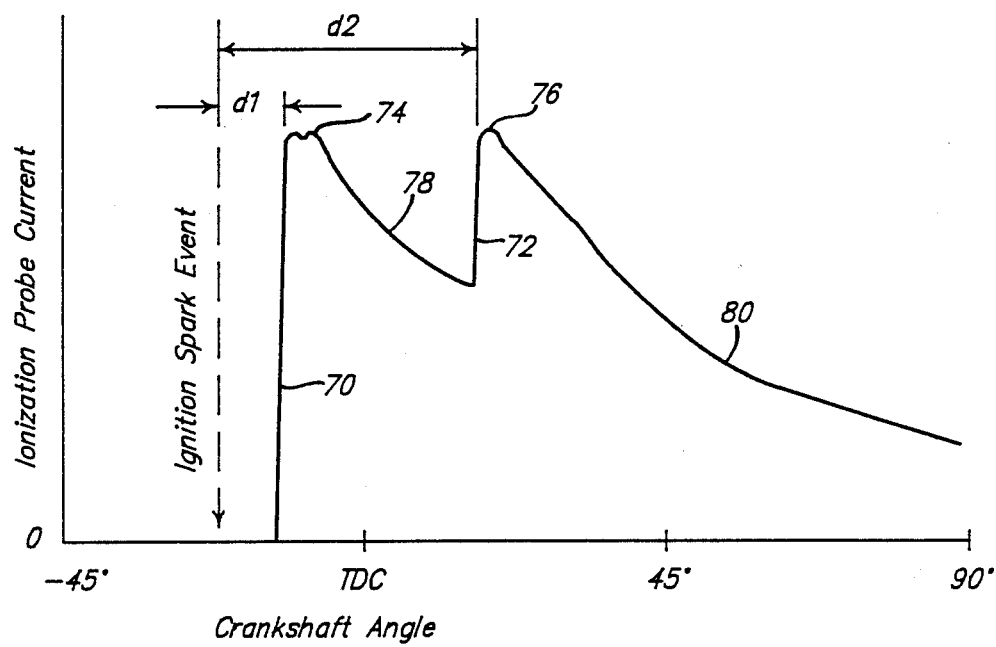
FIG. 6 is a graph of ionization probe current versus crankshaft angle illustrating the signals which may be obtained from the two ion gap arrays in accordance with the present invention.

In FIG. 6 there is shown a graph of ionization probe current versus crackshaft angle. The curve has a first steeply rising portion 70 and a second steeply rising portion 72. The first steeply rising portion 70 corresponding to the flame front arrival at one of the ion gap electrodes 21, 22, 23. A first peak portion 74 and a second peak portion 76 are also shown. These peak portions 74, 76 may be distorted, flattened or ragged due to the successive activation of several electrodes in an oin gap array by the flame front. On the abscissa, TDC indicates the crankshaft position for compression stroke top dead center. The line labeled Ignition Spark Event corresponds to the time at which the spark plug fired. D1 indicates the time interval from the spark event until flame front reaches one of the electrodes 21, 22, 23 in the first array. D1 is largely the ignition delay time measured with respect to the crankshaft angle in FIG. 6. Likewise D2 represents the duration of time between the ignition spark event and the arrival of the flame front at the second set of electrodes 26–38. D2 minus D1 is substantially as the charge burning time measured with respect to the crankshaft angle.

Beginning at the extreme left side of FIG. 6, the ionization probe current will be zero before the ignition spark event. No current will be conducted between any of the ion gaps 21, 22, 23, 26–38 and the combustion chamber. Beginning with the ignition spark event, a flame front will abvance radially outward from the spark plug gap 24 as shown in FIG. 1. When this flame flont reaches any of the ion gap electrodes, specifically one of those nearest the spark plug gap 24, it will permit current to flow from that gap to the combustion chamber wall. At this point, the ionization probe current curve will rapidly rise, as indicated by the first steeply rising portion 70. This event permits the measurement of D1 to be made. If the flame front is not uniform, it will reach one of the electrodes 21, 22, 23 before the others. This will cause the first peak portion of the curve to have a rippled portion 74. Once all of the electrodes 21, 22, 23 nearest the spark plug 18 are activated by the flame front, the ionization probe current will begin to decay. This occurs because the ions in the vicinity of the electrodes 21, 22, 23 will rapidly recombine and become progressively less electrically conductive. The decay is shown in FIG. 6 by the first falling portion of the curve 78.

As the flame front progresses even father from the spark plug 18, it will eventually reach the second ion gap array more remote from the spark plug, comprising the seven electrodes, 26–38. The ionization of the first of these electrodes will cause the ionization probe current to again rise, as shown in the steeply rising portion 72. The second peak portion 76 may be ragged due to the ionization and decay of successive ones of the seven electrodes 26–38 in the second array. Once all of these electrodes have been ionized, the ions will again become less conductive in the vicinity of the electrodes 26–38 and will cause the ionization probe current to drop, as shown by the second falling portion 80 of the curve. The curve will eventually fall to zero as the ionization probe current reaches zero and will remain there until the next ignition spark event in the combustion chamber.

Figure 7:
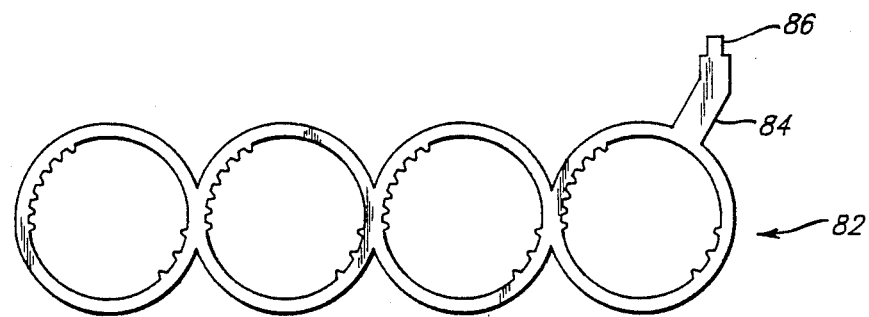
FIG. 7 is a plan view of four ion gap electrode rings connected in parallel for four engine cylinders in accordance with the present invention.

In FIG. 7, there is shown a set of four electrode rings 82 connected together in parallel. Each ring is similar to the individual electrode ring 48 shown in FIG. 2. It can be seen that only one tab portion 84 is necessary to connect the electrode rings to a voltage source because all of the electrode rings 82 are connected electrically. Electrical connection to the electrode rings 82 may be made by means of a blade connector tab 86 at the extreme end of the tab portion 84.

Figure 8:
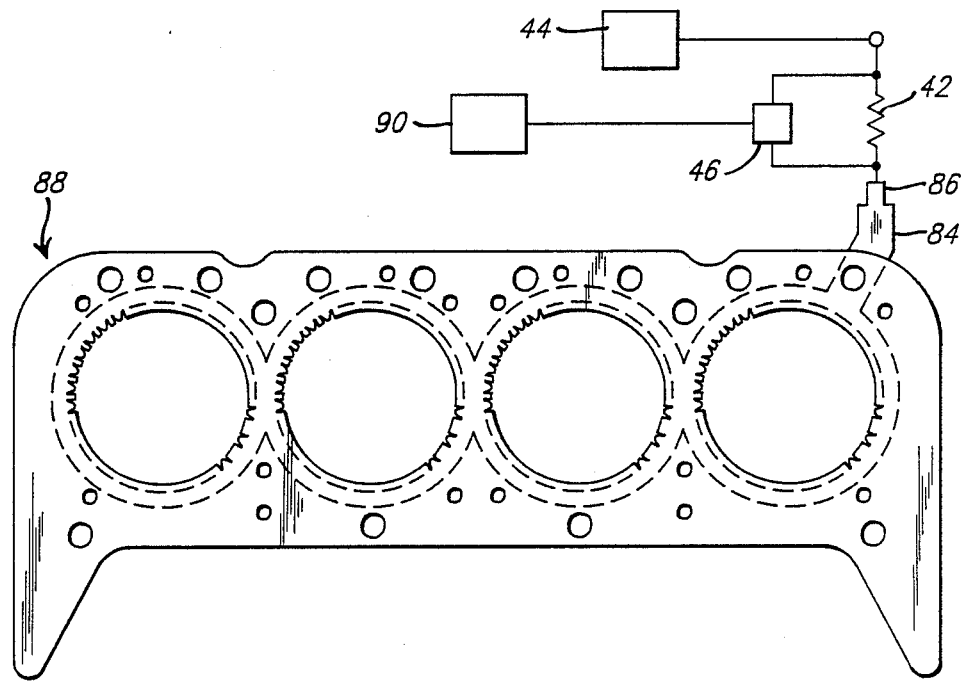
FIG. 8 is a plan view of an engine cylinder head gasket with the ion gap electrode rings shown in FIG. 7 installed in accordance with the present invention.

In FIG. 8, the electrode ring 82 that was shown in FIG. 7 is shown installed in a cylinder head gasket 88. The resistor 42 is connected on one end to the blade connector tab 86 and the voltage measuring device 46 is connected across the two ends of the resistor 42. The voltage source 44 is connected to the opposite end of the resistor 42. An electronic engine controller 90 is connected to the voltage measuring device 46. In this way, the electronic engine controller 90 is provided with sufficient information to calculate the ignition delay and the charge burning time for each of the cylinders of the engine on a real-time basis. This controller 90 may then respond to this information buy making suitable adjustments, for example, to the timing and air/fuel ratio, to optimize the engine operation.

A further consideration is that with the ion gap apparatus 10 installed in a multi-cylinder engine, a means is necessary for distinguishing the signals for each of the cylinders. This may be done by correlating the time occurrence of the electrical signals from the ion gap apparatus 10 with the position of the engine in its mechanical cycle utilizing knowledge of the engine camshaft position at the time various portions of the signal are received. One such method for distinguishing signals from various cylinders of an engine is taught in applicant's U.S. Pat. No. 4,116,173, the teachings of which are incorporated herein by reference.

The actual calculation of ignition delay and charge burning time may be accomplished by the engine controller 90 in the following manner. By way of definition:

$d1$ = the distance from the spark plug 18 to the first ion probe array 21, 22, 23;
$d2$ = the distance from the spark plug 18 to the second more remote ion probe array 26–38;
$D1$ = the time duration between the ignition spark event and ionization of the first probe array 21, 22, 23;
$D2$ = the time duration between the ignition spark event and ionization of the second probe array 26–38;
$ID$ = ignition delay signal; and
$CBT$ = charge burning time signal.

The following equations may then be derived:

$$ID = D1 - kCBT$$

$$CBT = D2 - ID, \text{ where } k = d1/d2$$

These two simultaneous equations can be readily solved for the two unknowns ID and CBT by a control system computer 90 which is given k, an ignition spark event signal, and the ion probe current signals for measurement of D1 and D2. Implicit in these equations is the assumption that on a given combustion cycle, the gross linear velocity of flame propagation in the combustion chamber following the ignition delay period is a constant. Experimental test results may indicate that the value of k may be advantageously modified from this theoretical value of d1/d2.

As is well known, the velocity of a flame front in a combustion chamber is not constant as assumed for the above equations. Instead, a flame front tends to accelerate as it is propelled into the unburned volume by the increasing volume of hot expanding products of combustion behind the front. More complex mathematical expressions for flame propagation velocity may be readily included in the concept of separating the variables, ignition delay and charge burning time, as taught by the above equations. Examples of more complex flame propagation velocity expressions may be found in society of Automotive Engineers Paper 880129.

The usefulness and the manner of utilization of the ion probe signals and the calculated values of ignition delay and charge burning time will depend on a number of factors including the control system computer 90 design for a particular engine. Other uses may be made of the ionization prode signals besides calculating the ignition delay or charge burning time depending upon statistical qualities of the signals for a particular design. For example, the distortion of the peaks 74, 76 in FIG. 6 may provide a measure of flame front raggedness, which may correlate well with air/fuel ratio. This information may be useful in controlling engine parameters. Also, an experimental cylinder head gasket incorporating multiple ion probe electrodes, which are not electrically connected in parallel, but instead are capable of each delivering an independent signal, should provide useful information in determining the best ion probe locations for the design of a production head gasket. In addition, individual ion gap electrodes of larger span may be used to sample greater portions of the flame front in place of the multiple smaller individual electrodes as described above.

While it will be apparent that the teachings herein are well calculated to teach one skilled in the art the method of making preferred embodiments of this invention, it will be appreciated that the invention is susceptible to modification, variation and change without departing from the proper scope and meaning of the subjoined claims.

I claim:

1. In an internal combustion engine having at least one combustion chamber and ignition means for igniting successive charges supplied to said chamber, ionization gap means for detecting the arrival of a flame front propagated within said chamber from the ignition of a charge contained in said chamber, said ionization gap means incuding a plurality of electrodes for detecting the arrival of said flame front at more than one location in said chamber, each of said locations being generally equidistantly spaced from said ignition means.

2. The invention according to claim 1, wherein said plurality of electrodes includes at least three electrodes.

3. The invention according to claim 1, wherein said plurality of electrodes includes a first set of electrode members which are generally equidistantly spaced from said ignition means.

4. The invention according to claim 3, wherein said plurality of electrodes also includes a second set of electrode members which are generally equidistantly spaced from said ignition means at a distance which is greater than the distance between said ignition means and said first set of electrode members.

5. The invention according to claim 4, wherein all of said electrode members are electrically connected in parallel.

6. The invention according to claim 5, wherein all of said electrodes are integrally formed on a metallic member having an annular shape which generally corresponds to the shape of said chamber.

7. The invention according to claim 6, wherein said ionization gap means also includes a pair of insulator members, with said metallic member being interposed between said insulator members.

8. The invention according to claim 6, wherein said metallic member is disposed generally between a cylinder head and a cylinder block which form said chamber.

9. The invention according to claim 8, wherein said metallic member forms part of a cylinder head gasket.

10. The invention according to claim 9, wherein a portion of said cylinder head gasket is folded over at least a portion of said metallic member.

11. The invention according to claim 6, wherein each of said electrode members are protrustions formed generally around the interior diameter of said metallic member.

12. The invention according to claim 11, wherein said metallic member is generally flat and includes tab means for enabling an eletrical connection to be made to said metallic member.

13. The invention according to claim 4, wherein said ionization gap means includes data processing means for generating a signal indicative of a charge burning time from the signals generated by said first and second sets of electrodes.

14. A probe for sensing the propagation of a flame front in at least one combustion chamber of an internal combustion engine, comprising:
annular means conforming generally to the shape of said chamber and having electrode means for sensing the propagation of said flame front at a plurality of locations in said chamber, said locations being disposed along the perimeter of said chamber; and
insulator means associated with said annular means for isolating said electrode means from contact with the walls of said chamber.

15. An ionization gap detector for an internal combustion engine having at least one combustion chamber and ignition means for causing a flame front to propagate in said chamber from the ignition of a charge supplied to said chamber, comprising:
probe means capable of being mounted to said chamber and having a plurality of electrode locations for sensing the arrival of said flame front at a plurality of locations within said chamber which are remote from said ignition means; and
processing means connected to said probe means for generating a signal indicative of a charge burning time within said chamber.

16. The ionization gap detector according to claim 15, wherein said probe means includes first and second sets of electrodes, and said processing means determines said charge burning time from the difference in time that said first and second sets of electrodes sense the arrival of said flame front.

17. The ionization gap detector according to claim 15, wherein said processing means includes impedance means for measuring the current produced by said electrodes when the arrival of said flame front is sensed.

18. For an internal combustion engine having more than one combustion chamber, ionization gap means exposed to each of said combustion chambers for detecting the arrival of a flame front propagated within each of said chambers by the ignition of individual charges contained in said chambers, said gap means for one of said combustion chambers being electrically connected in parallel to said gap means for another of said chambers.

19. The invention according to claim 18, wherein said gap means is supported by a cylinder head gasket.

20. The invention according to claim 18, wherein said gap means is electrically insulated by a cylinder head gasket.

21. A method of measuring the arrival time of a flame front in a combustion chamber, comprising the steps of:
providing a plurality of sensing locations which are generally equidistantly spaced from an ignition location in said combustion chamber; and
determining the arrival time of said flame front from the signals generated at said plurality of sensing locations.

22. The method according to claim 21, wherein said plurality of sensing locations comprise an array of ionization gaps.

23. A method for obtaining a measurement of charge burning time in a combustion chamber of an internal combustion engine, said combustion chamber arranged to be ignited by a spark plug, wherein said measurement is exclusive of an ignition delay time comprising the steps of:
measuring a time from an ignition spark event to the arrival of a flame front at a first predetermined distance from said spark plug;
measuring a time from an ignition spark event to the arrival of said flame front at a second predetermined distance which is more remote from said spark plug than said first predetermined distance.

24. The method according to claim 23, wherein a plurality of sensing locations are provided at both said first and second predetermined distances.

25. For an internal combustion engine having at least one combustion chamber for containing a charge and an igition means for igniting said charge, a device for detecting the ionization of said charge produced by a flame front propagated within said chamber from the ignition of said charge, said device comprising:
a set of electrically conductive members each being in contact with said charge and electrically isolated from said combustion chamber, and each said conductive member being positioned a predetermined equal distance from said ignition means;
voltage providing means connected to each conductive member for creating a voltage bias between said electrically conductive members and said combustion chamber; and
means for measuring the current generated in the ionization gap between said conductive members and the combustion chamber when said flame front arrives at said conductive members.

26. The device according to claim 25 further comprising:
time measuring means connected to said device for measuring the time interval between the ignition of said charge and the arrival of said ionized charge at one of said conductive members.

27. In an internal combustion engine having at least one combustion chamber and ignition means for igniting successive charges supplied to said chamber, ionization gap means for detecting the arrival of a flame front propagated within said chamber from the ignition of a charge contained in said chamber, said ionization gap means including at least one electrode for detecting the arrival of said flame front at a location in said chamber which is spaced from said ignition means, said electrode being isolated from the walls of said combustion chamber by a head gasket for said engine.

* * * * *

UNITED STATES PATENT AND TRADEMARK OFFICE
CERTIFICATE OF CORRECTION

PATENT NO.  : 4,947,680

DATED       : August 14, 1990

INVENTOR(S) : John A. McDougal

It is certified that error appears in the above-identified patent and that said Letters Patent is hereby corrected as shown below:

Column 1, line 10, "air-fuel" should be --air/fuel--

Column 2, line 15, "learn-burn" should be --learn-burn--

Column 2, line 58, "buring" should be --burning--

Column 4, line 20, "16-38" should be --26-38--

Column 4, line 61, "porjections" should be --projections--

Column 5, line 20, "22, 22" should be --21, 22--

Column 5, line 41, "consequently" should be --Consequently--

Column 5, line 47, "protude" should be --protrude--

Column 6, line 23, "corresponding" should be --corresponds--

Column 6, line 27, "oin" should be --ion--

Column 6, line 46, "abvance" should be --advance--

Column 6, line 48, "flont" should be --front--

Column 6, line 65, "father" should be --farther--

UNITED STATES PATENT AND TRADEMARK OFFICE
CERTIFICATE OF CORRECTION

PATENT NO. : 4,947,680

DATED : August 14, 1990

INVENTOR(S) : John A. McDougal

It is certified that error appears in the above-identified patent and that said Letters Patent is hereby corrected as shown below:

Column 7, line 35, "buy" should be --by--

Column 8, line 31, "prode" should be --probe--

Column 8, line 32, insert --the-- after "upon"

Column 8, line 63, claim 1, "incuding" should be --including--

Column 9, line 31, cliam 11, "protrustions" should be --protrusions--

Column 10, line 52, claim 25, "igition" should be --ignition--

Signed and Sealed this

Eleventh Day of February, 1992

Attest:

HARRY F. MANBECK, JR.

Attesting Officer

Commissioner of Patents and Trademarks